United States Patent Office

3,486,855
Patented Dec. 30, 1969

3,486,855
METHOD FOR THE QUALITATIVE IDENTIFICATION OF NEOPRENE
Panagiotis L. Panagoulias, Highland Park, Mich., assignor to the United States of America as represented by the Secretary of the Army
No Drawing. Filed Mar. 2, 1967, Ser. No. 621,104
Int. Cl. G01n 33/44
U.S. Cl. 23—230                                                                 7 Claims

ABSTRACT OF THE DISCLOSURE

A method for the qualitative identification of neoprene comprising the steps of: dissolving a test sample in methylcellosolve; and reacting said test sample solution with P-dimethylaminobenzaldehyde to produce a complex salt having the following structural formula when said sample contains neoprene:

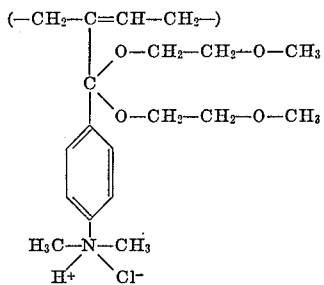

The invention described herein may be manufactured and used by or for the Government for governmental purposes without the payment to me of any royalty thereon or therefor.

The present invention relates to a method for the qualitative identification of neoprene rubber under all conditions of occurrence. More particularly, the invention relates to a non-pyrolytic, catalytic condensation reaction which provides a selective test for neoprene under all conditions of occurrence.

The analytical methods of the prior art consisted essentially of an initial pyrolysis of the elastomer sample to be tested with subsequent analysis of the sample being accomplished by passing the vapors formed by such pyrolysis through one or two reagent solutions. The colors produced by these reagents served to indicate which elastomer was present. Such methods were relatively accurate when the sample consisted of a single component elastomer composition; however, when a number of such elastomers were present the various tests often yielded ambiguous results due to the formation, at the same time, of a number of colored solutions characteristic of each of the elastomer compounds present in the sample. Thus, when a sample containing a mixture of neoprene, polyisoprene and butadiene was tested, the sample was pyrolyzed and its vapors passed into one or two reagent solutions. In the reagent solutions each of the compounds produced its characteristic color. The mixture of the three colors yielded an unreadable result and at most all that could be said of the sample was that it did in fact contain a mixture of elastomers. The exact identification of any one of the components of the mixture was impossible with any prior art method.

It is therefore an object of the present invention to provide a method for the qualitative analysis of neoprene which obviates the above difficulty.

Another object of the present invention is the provision of a simple, accurate and specific method for the qualitative identification of neoprene under all conditions of occurrence, including as a mixture or compound with other elastomers.

The following description will make other objects and advantages of the present invention obvious to those skilled in the qualitative analytical arts.

According to the present invention there is provided a mehod for the qualitative identification of neoprene under all conditions of occurrence.

More particularly, the invention provides a method as set out above, which method by using specific procedures eliminates the interference of polymers or elastomers other than neoprene which may be present in a particular test sample.

Still more particularly, the invention provides a method for the qualitative identification of neoprene comprising the steps of dissolving a test sample in methylcellosolve and reacting said dissolved test sample with P-dimethylaminobenzaldehyde. The method yields a specific colored product when the test sample contains neoprene alone or as a compound or mixture with other elastomers.

A small portion, about 3 gs., of a test sample is cut up into small pieces and these same extracted with acetone according to ASTM Procedure D-297 for a ten hour period. The extracted sample is then dried at room temperature. Such acetone extraction is a precautionary measure to eliminate vulcanization or traces thereof and, as such, the step may be eliminated or performed as required by the individual sample.

The extracted and dried sample is then placed in a test tube with 70 ml. of methylcellosolve and this mixture is refluxed for a two hour period in order to insure proper dissolving of the sample solute in the methylcellosolve solvent.

Since the solution of this test must be free of chlorine other than that of the neoprene molecule, in order that proper results are obtained, it is imperative that clean glassware and pure reagents are used. Even when all precautions are duly exercised, testing for chlorine with a AgNO$_3$ solution should be performed and such reaction carried out until the test is negative for the presence of chlorine.

Once the test for chlorine does show a negative result, a 5 ml. portion of the sample solution is transferred to a tube containing 0.18 g. of P-dimethylaminobenzaldehyde.This mixture is shaken and then boiled for one or two minutes. Such heating insures that the reaction between the neoprene and the P-dimethylaminobenzaldehyde, described in detail below, will occur and be carried to a proper degree of completion. The appearance of a permanent yellow-green color at this point indicates the presence of neoprene rubber in the sample.

The chemical reactions which occur in the test are explained as follows: The P-dimethylaminobenzaldehyde reacts with the neoprene through the action of the hydrogen on the carbon of the benzaldehyde carbonyl group, which hydrogen atom strips chlorine from the neoprene molecule and porduce HCl. The carbon of the benzaldehyde carbonyl group then steps into the position vacated by the chlorine forming a condensation-union. This reaction is demonstrated graphically as follows:

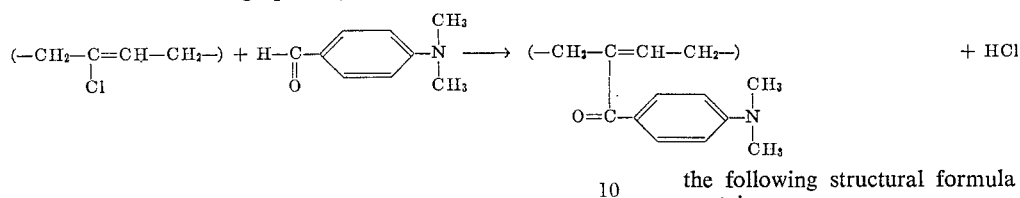

The oxygen of the latter compound, donated by the benzaldehyde carbonyl group, reacts with the methylcellosolve solvent and forms an acetal compound under the catalytic influence of the HCl formed during the chlorine split with the neoprene. This reaction is represented graphically as follows:

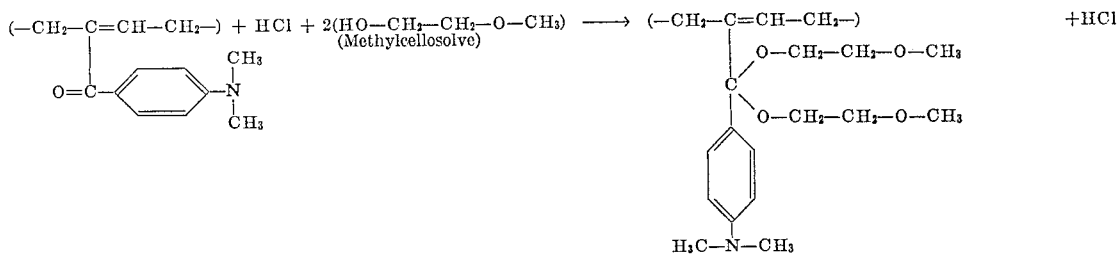

Subsequent to the formation of the acetal, the HCl reacts with the amino group of the benzaldehyde, which reaction is as follows:

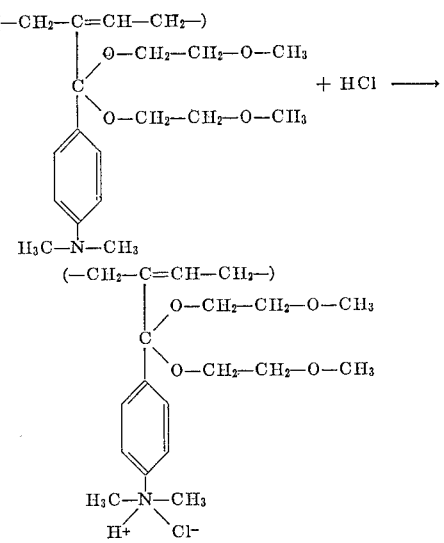

The reaction increases the valence of the nitrogen from three to five with a polar fifth linkage which is primarily responsible for the yellow-green color formation.

The above test is specific for neoprene under all conditions of occurrence and the procedures ultilized eliminate the effects and interferences of other elastomer compounds which may be present as mixtures or compounds with the neoprene elastomer.

What is claimed is:

1. A method for the qualitative identification of neoprene comprising the steps of:
    (a) dissolving a test sample in ethylcellosolve to form a test sample solution; and
    (b) reacting said test sample solution with P-dimethylaminobenzaldehyde to produce a complex salt having

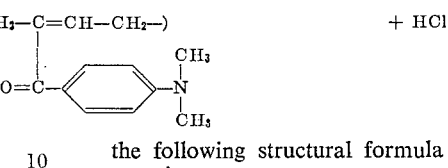

the following structural formula when said sample contains neoprene:

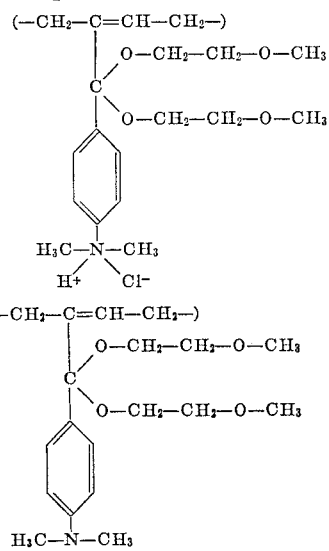

2. A method in accordance with claim 1 wherein said test sample is extracted with acetone according to ASTM Procedure D–297 prior to being dissolved in said methylcellosolve.

3. A method in accordance with claim 2 wherein said test sample solution is refluxed for a period of about two hours prior to reacting it with said P-dimethylaminobenzaldehyde.

4. A method in accordance with claim 1 wherein said test sample solution is refluxed for a period of about two hours prior to reacting it with said P-dimethylaminobenzaldehyde.

5. A method in accordance with claim 4 wherein said test sample solution is treated with silver nitrate subsequent to being refluxed and prior to being reacted with said P-dimethylaminobenzaldehyde.

6. A method in accordance with claim 1 wherein said test sample solution is treated with silver nitrate to render it free of chlorine prior to reaction with said P-dimethylaminobenzaldehyde.

7. A method in accordance with claim 1 wherein said complex salt has a yellow-green color when said test sample contains neoprene.

References Cited

Burchfield, H., Chem. Abstr. 40, 3292[2], 1946
Mano, E. B., Chem. Abstr. 57, 997f, 1962
ASTM Standards on Rubber Products 1957, pp. 132, 133. TS1892A45.

MORRIS O. WOLK, Primary Examiner

R. M. REESE, Assistant Examiner